US011450879B2

(12) United States Patent
Lee et al.

(10) Patent No.: US 11,450,879 B2
(45) Date of Patent: Sep. 20, 2022

(54) ELECTRODE ASSEMBLY

(71) Applicant: LG Chem, Ltd., Seoul (KR)

(72) Inventors: Shin Hwa Lee, Daejeon (KR); Woo Yong Lee, Daejeon (KR); Kieun Sung, Daejeon (KR)

(73) Assignee: LG Energy Solution, Ltd.

( * ) Notice: Subject to any disclaimer, the term of this patent is extended or adjusted under 35 U.S.C. 154(b) by 128 days.

(21) Appl. No.: 16/771,551

(22) PCT Filed: Jul. 9, 2019

(86) PCT No.: PCT/KR2019/008407
§ 371 (c)(1),
(2) Date: Jun. 10, 2020

(87) PCT Pub. No.: WO2020/105834
PCT Pub. Date: May 28, 2020

(65) Prior Publication Data
US 2021/0184242 A1  Jun. 17, 2021

(30) Foreign Application Priority Data

Nov. 19, 2018 (KR) ........................ 10-2018-0142344

(51) Int. Cl.
*H01M 10/04* (2006.01)
*H01M 10/0583* (2010.01)
*H01M 50/466* (2021.01)

(52) U.S. Cl.
CPC ... *H01M 10/0431* (2013.01); *H01M 10/0459* (2013.01); *H01M 10/0468* (2013.01); *H01M 10/0583* (2013.01); *H01M 50/466* (2021.01)

(58) Field of Classification Search
CPC ........... H01M 50/46–497; H01M 10/02–0525; H01M 10/058–0587
See application file for complete search history.

(56) References Cited

U.S. PATENT DOCUMENTS

2002/0160257 A1* 10/2002 Lee .................. H01M 10/0459
429/130
2002/0160258 A1* 10/2002 Lee .................... H01M 50/426
429/130

(Continued)

FOREIGN PATENT DOCUMENTS

EP       3246979 A1    11/2017
EP       3336951 A1     6/2018

(Continued)

OTHER PUBLICATIONS

European Search Report for Application No. EP19886921.6, dated Dec. 23, 2020, 11 pages.

(Continued)

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

An electrode assembly in which a positive electrode and a negative electrode are alternately stacked, and a separator is disposed between the positive and negative electrodes comprises: a folding unit, a negative electrode unit, and a positive electrode unit alternately inserted between layers of the separator of which one side and the other side are alternately folded in a zigzag shape in a direction perpendicular to a direction in which the positive electrode and the negative electrode are stacked; and a stacking unit in which the positive electrode, the separator, and the negative electrode, each of which is cut by a predetermined size, are sequentially stacked. The folding unit having a Z-folding structure and the stacking unit having a lamination & stacking structure may be bonded to each other. Thus, the positive electrode may increase in area relative to the negative electrode in the folding unit to increase in capacity.

21 Claims, 13 Drawing Sheets

(56) References Cited

U.S. PATENT DOCUMENTS

| | | | |
|---|---|---|---|
| 2003/0013012 A1* | 1/2003 | Ahn | H01M 10/0565 429/152 |
| 2007/0184350 A1* | 8/2007 | Kim | H01M 50/414 429/254 |
| 2008/0280208 A1 | 11/2008 | Naoi et al. | |
| 2009/0305121 A1* | 12/2009 | Yoon | H01M 10/0431 429/94 |
| 2010/0175245 A1 | 7/2010 | Do et al. | |
| 2010/0203384 A1* | 8/2010 | West | H01M 10/28 429/209 |
| 2010/0279161 A1* | 11/2010 | Kang | H01M 10/0583 429/94 |
| 2010/0279173 A1* | 11/2010 | Hying | H01M 50/44 427/126.3 |
| 2011/0104567 A1 | 5/2011 | Lee | |
| 2012/0121967 A1* | 5/2012 | Nakamura | H01M 50/119 429/163 |
| 2014/0050958 A1* | 2/2014 | Kwon | H01M 10/0585 429/94 |
| 2014/0072850 A1* | 3/2014 | Kwon | H01M 10/0413 429/94 |
| 2014/0099525 A1* | 4/2014 | Kwon | H01M 10/0436 429/94 |
| 2016/0293994 A1* | 10/2016 | Choi | H01M 10/0459 |
| 2016/0322618 A1* | 11/2016 | Jeong | H01M 50/451 |
| 2017/0338509 A1 | 11/2017 | Cho et al. | |
| 2019/0044177 A1 | 2/2019 | Lee et al. | |
| 2019/0252726 A1* | 8/2019 | Eom | H01M 10/045 |

FOREIGN PATENT DOCUMENTS

| | | |
|---|---|---|
| JP | 2001291647 A | 10/2001 |
| JP | 2009135079 A | 6/2009 |
| KR | 20030066960 A | 8/2003 |
| KR | 20080106678 A | 12/2008 |
| KR | 20110048839 A | 5/2011 |
| KR | 20130118767 A | 10/2013 |
| KR | 20130118769 A | 10/2013 |
| KR | 20130132341 A | 12/2013 |
| KR | 20140062761 A | 5/2014 |
| KR | 20140102383 A | 8/2014 |
| KR | 20140113319 A | 9/2014 |
| KR | 20150100017 A | 9/2015 |
| KR | 20160054924 A | 5/2016 |
| KR | 20170111690 A | 10/2017 |
| KR | 20180006324 A | 1/2018 |
| WO | 2014042424 A1 | 3/2014 |
| WO | WO-2018048165 A1 * | 3/2018 ......... H01M 50/463 |

OTHER PUBLICATIONS

International Search Report from Application No. PCT/KR2019/008407 dated Oct. 15, 2019, 5 pages.

* cited by examiner

ELECTRODE ASSEMBLY

CROSS-REFERENCE TO RELATED APPLICATION

The present application is a national phase entry under 35 U.S.C. § 371 of International Patent Application No. PCT/KR2019/008407, filed on Jul. 9, 2019, which claims priority from Korean Patent Application No. 10-2018-0142344, filed on Nov. 19, 2018, the disclosures of which are hereby incorporated by reference in their entireties.

TECHNICAL FIELD

The present invention relates to an electrode assembly embedded in a secondary battery, and more particularly, to an electrode having advantages of a lamination & stacking method with a relatively stable structure and advantages of a Z-folding method with a relatively small allowable tolerance.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Such a secondary battery is configured so that an electrode assembly is built in a battery case (for example, a pouch, a can, and the like). The electrode assembly built in the battery case is repeatedly chargeable and dischargeable because of a structure in which a positive electrode/a separator/a negative electrode are stacked.

FIG. 1a is a side view illustrating a process of manufacturing a unit cell 4 to be stacked in an electrode assembly through a lamination & stacking process among electrode assemblies according to the related art, and FIG. 1b is a side view illustrating a state in which the plurality of unit cells 4 manufactured in FIG. 1a are stacked.

Referring to the drawings, in the lamination & stacking manner, the positive electrode 1, the separator 3, the negative electrode 2, and the separator 3 are continuously unwound to be supplied in a state of being wound in the form of a roll. Here, each of the positive electrode 1 and the negative electrode 2 is cut by a predetermined size and moved together with separators 3 that are continuously supplied, to pass through a laminating device. Here, the positive electrode 1 has a structure in which a positive electrode active material is applied to a surface of a positive electrode collector, and the negative electrode 2 has a structure in which a negative electrode active material is applied to a surface of a negative electrode collector.

While passing through the laminating device, heat and a pressure may be applied between the positive electrode 1, the separator 3, the negative electrode 2, and the separator to bond the positive electrode 1, the separator 3, the negative electrode 2, and the separator 3 to each other. In the bonded state, the positive electrode 1 and the positive electrode 1, which are adjacent to each other (the negative electrode 2 and the negative electrode 2, which are adjacent to each other), are cut therebetween to continuously manufacture one unit cell 4 in which the positive electrode 1, the separator 3, the negative electrode, and the separator 3 are sequentially stacked downward. The unit cells 4 are stacked in a predetermined number to manufacture an electrode assembly.

Also, the electrode assembly according to the related art may also be manufactured through a Z-folding method. The electrode assembly manufactured through the Z-folding method has a structure in which a positive electrode and a negative electrode alternately inserted at both sides while a continuously supplied separator is provided at a center and then folded in a zigzag shape. It is known from Korean Patent Application Laid-Open No. 10-2014-0062761, 10-2011-0048839, and the like.

In the lamination & stacking method as described above, since layers to be stacked are bonded to each other, the electrode assembly may have superior durability against an external impact and be stable compared to other manufacturing methods. On the other hand, since the processes are performed in order of stacking of the electrodes and the separator, lamination, cutting, and stacking of the unit cells, the number of processes is greater than that of other processes. On the other hand, in the case of the Z-folding method, a process period is shorter, resulting in higher production rate when compared to the lamination & stacking method.

Furthermore, when the number of processes increases, allowable tolerances for each process may be accumulated. For example, an allowable tolerance in the lamination & stacking method is determined in consideration of, when the electrodes and the separator are stacked, an allowable tolerance when cutting the positive electrode and the negative electrode and an allowable tolerance when cut into the unit cells. As a result, the allowable tolerance in the electrode assembly manufactured through the lamination & stacking method may be reduced. Thus, there is a problem that the size of the positive electrode relative to the negative electrode increases. On the other hand, when the electrode assembly is manufactured in the Z-folding manner, since the number of processes is small, the positive electrode may have a size greater than that of the negative electrode.

That is, since the capacity of the electrode assembly increases as the size of the positive electrode is greater than that of the negative electrode, it is preferable that the size of the positive electrode increases as much as possible. However, the size of the positive electrode is limited to a certain limit to reduce possibility of degradation of the positive electrode and an occurrence of short circuit. Here, the size of the positive electrode is more reduced by the allowable tolerance during the production, but the size of the positive electrode is more limited in the lamination & stacking manner because the number of processes increases (due to the large allowable tolerance).

DISCLOSURE OF THE INVENTION

Technical Problem

Therefore, a main object of the present invention is to provide an electrode assembly having an advantage of an electrode assembly using a Z-folding method (increasing in size of the positive electrode compared to a negative electrode due to reduction of an allowable tolerance) and an advantage of an electrode assembly using a lamination & stacking method (a negative electrode, a separator, and a positive electrode, which constitute a unit cell, are bonded to improve stability).

Technical Solution

The present invention for achieving the above object comprises an electrode assembly in which a positive electrode and a negative electrode are alternately stacked, and a separator is disposed between the positive electrode and the negative electrode, the electrode assembly comprising: a folding unit a negative electrode unit and a positive electrode unit are alternately inserted between layers of the separator of which one side and the other side are alternately folded in a zigzag shape in a direction perpendicular to a direction in which the positive electrode and the negative electrode are stacked; and a stacking unit in which the positive electrode, the separator, and the negative electrode, each of which is cut by a predetermined size, are sequentially stacked, wherein the negative electrode is disposed at the outermost layer of the negative electrode unit, and the positive electrode is disposed at the outermost layer of the positive electrode unit, and the stacking unit is stacked on each of the uppermost layer and the lowermost layer of the folding unit.

Also, the positive electrode, the separator, and the negative electrode, which are stacked in the stacking unit, may be bonded to each other at contact surfaces therebetween. The bonding in the stacking unit may be performed by applying heat and a pressure.

When the stacking unit is stacked on the folding unit, the positive electrode or the negative electrode, which is disposed at the outermost layer of the stacking unit, may be a single-sided electrode in which an active material is applied to only one surface of a collector.

Here, in the single-sided electrode, the active material may be applied to a surface contacting the separator. That is, a positive electrode collector or the negative electrode collector may be disposed at the outermost layer.

In a first embodiment of the present invention, the negative electrode unit may be one negative electrode, and the positive electrode unit may be one positive electrode. Also, the negative electrode or the positive electrode may be stacked at the outermost layer of the folding unit, and the separator may be stacked on a layer of the stacking unit, which contacts the folding unit.

In this embodiment, the stacking unit may be a monocell in which one positive electrode, one negative electrode, and two separators are stacked, wherein one of the separators may be stacked between the positive electrode and the negative electrode, and the other one may be stacked at a position contacting the outermost layer of the folding unit.

In a second embodiment, the separator may be stacked on the outermost layer of the folding unit, and the stacking unit may be a monocell in which one positive electrode, one negative electrode, and one separator are stacked, wherein the separator may be stacked between the positive electrode and the negative electrode.

In a third embodiment, the negative electrode or the positive electrode may be stacked at one of the outermost layers of the folding unit, and the separator may be stacked at the other one of the outermost layers, the stacking unit stacked on one of the outermost layers, at which the positive electrode or the negative electrode is stacked, may be a monocell in which one positive electrode, one negative electrode, and two separators are stacked, wherein one of the separators may be stacked between the positive electrode and the negative electrode, and the other one may be stacked at a position contacting the outermost layer of the folding unit, and the stacking unit stacked on one of the outermost layers, at which the separator is stacked, may be a monocell in which one positive electrode, one negative electrode, and one separator are stacked, wherein the separator may be stacked between the positive electrode and the negative electrode.

In the foregoing embodiments, the separator stacked between the negative electrode unit and the positive electrode unit in the folding unit may have a thickness different from that of the separator stacked within the stacking unit.

Furthermore, the negative electrode unit may be a bicell in which the negative electrode is stacked at each of both the outermost layers, and one or more positive electrodes are stacked between the negative electrodes, and the positive electrode unit may be a bicell in which the positive electrode is stacked at each of both the outermost layers, and one or more negative electrode are stacked between the positive electrodes. In more detail, the negative electrode unit may be a bicell in which the negative electrode/the separator/the positive electrode/the separator/the negative electrode are stacked sequentially from the outermost layer, and the positive electrode unit may be a bicell in which the positive electrode/the separator/the negative electrode/the separator/the positive electrode are stacked sequentially from the outermost layer. Here, the positive electrode, the separator, the negative electrode, which are stacked to constitute each of the negative electrode unit and the positive electrode unit, may be bonded to each other at contact surfaces therebetween.

Also, the separator stacked between the negative electrode unit and the positive electrode unit in the folding unit may have a thickness different from that of the separator stacked within the negative electrode unit and the positive electrode unit.

Also, in the stacking unit, the separator may be stacked at the outermost layer at an opposite side of a direction in which the stacking unit faces the folding unit.

Furthermore, a stacking unit in which the positive electrode, the separator, the negative electrode, each of which is cut by a predetermined size, may be sequentially stacked is additionally stacked on an outer surface of the stacking unit. In the stacking unit, the stacking units disposed at the upper and lower portions of the folding unit may have the same stacking structure, and more or fewer electrodes are stacked according to specification of the electrode assembly.

Also, as necessary, two or more folding units may be continuously stacked between the stacking units disposed at the uppermost layer and the lowermost layer. Here, the stacking unit in which the positive electrode, the separator, the negative electrode, each of which is cut by a predetermined size, may be sequentially stacked is inserted between the two folding units that are continuously stacked. The stacking unit 200 may be a bicell in which the uppermost layer and the lowermost layer have the same polarity or a monocell in which the uppermost layer and the lowermost layer have polarities different from each other and may have the same structure as the stacking unit disposed each of the upper and lower portions of the folding unit.

Furthermore, the negative electrode unit stacked on the folding unit may be one negative electrode, and the positive electrode unit may be one positive electrode, the negative electrode may have an area greater than that of the positive electrode, and a gas (d) between a point at which the separator is folded and the negative electrode may be less than that between the point at which the separator is folded and the positive electrode.

Also, in the folding unit, an end of the separator may comprise an extension part extending by a predetermined length, and the extension part may surround the folding unit and the stacking units after the stacking units are stacked on upper and lower portions of the folding unit, and an end of the extension part may be bonded to be fixed to a surface of the folding unit or the stacking unit.

Furthermore, as the electrode assembly having the above technical features is provided, the present invention may additionally provide a secondary battery in which the electrode assembly according to the present invention is embedded in the pouch and a secondary battery module in which a plurality of secondary batteries are electrically connected to each other.

Advantageous Effects

According to the present invention having the above-described configuration, the folding unit having the Z-folding structure (having a structure of the electrode assembly manufactured in the Z-folding manner) and the stacking unit having a lamination & stacking structure (having a structure of the electrode assembly manufactured in the lamination &stacking method) may be bonded to each other. Thus, the positive electrode may increase in area relative to the negative electrode in the folding unit to increase in capacity, and the stacking unit may be disposed on the outermost layer of the folding unit to improve stability.

Furthermore, the positive electrode or the negative electrode, which is disposed at the outermost layer of the stacking unit, may be provided as the single-sided electrode in which the active material is applied to only one surface of the collector to reduce the degradation due to the precipitation of the active material and also reduce the possibility of occurrence of the short circuit due to the external impact.

Also, the separator stacked between the negative electrode unit and the positive electrode unit in the folding unit may have a thickness different from that of the separator stacked within the stacking unit to minimize the volume.

The present invention may provide the structure in which the separator is stacked at the outermost layer at an opposite side of a direction in which the stacking unit faces the folding unit and the structure in which the plurality of stacking units are additionally stacked to provide the various structures according to the required specification of the secondary battery.

Two or more folding units may be continuously stacked. That is, when the stacking number of folding unit increases, the cumulative tolerance may increase. Thus, two folding units, each of which has less stacking number, may be stacked to reduce the cumulative tolerance, and also, the stacking number may increase to increase in capacity.

Also, in the folding unit, the end of the separator may comprise the extension part extending by a predetermined length, and the extension part may surround the folding unit and the stacking units after the stacking units are stacked on the upper and lower portions of the folding unit, and the end of the extension part may be bonded to be fixed to the surface of the folding unit or the stacking unit, thereby preventing the shaking of the folding unit and the stacking unit and improving the durability against the external impact.

Furthermore, the present invention may additionally provide a secondary battery in which the electrode assembly according to the present invention is embedded in the pouch and a secondary battery module in which a plurality of secondary batteries are electrically connected to each other.

MODE FOR CARRYING OUT THE INVENTION

Figure 1A:
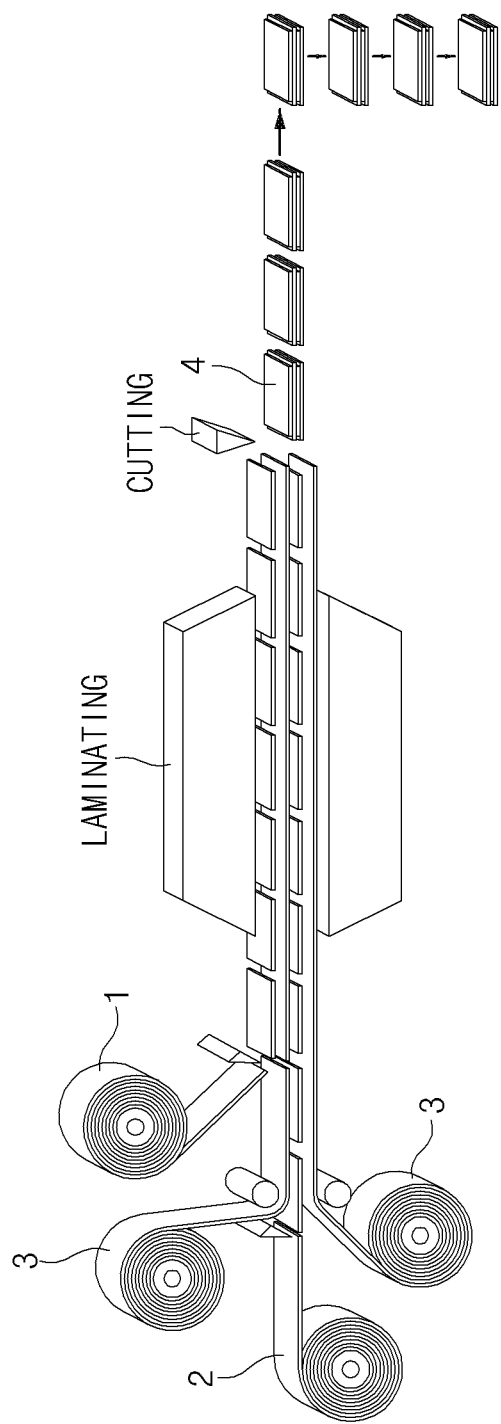
FIG. 1a is a side view illustrating a state in which unit cells are manufactured in a lamination & stacking manner.
Figure 1B:
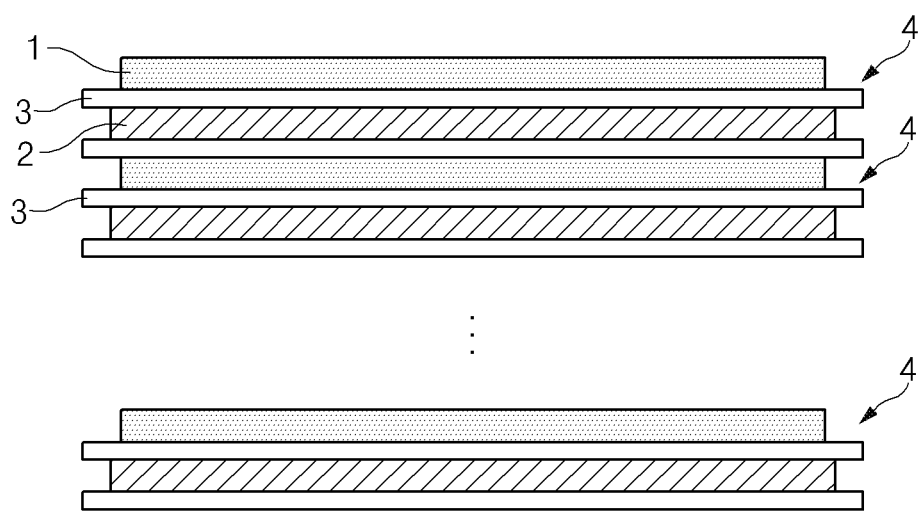
FIG. 1b is a front view illustrating a state in which the unit cells manufactured in FIG. 1a are stacked to manufacture an electrode assembly.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly in which a positive electrode 10 and a negative electrode 20 are alternately stacked, and separators 30 and are disposed between the positive electrode 10 and the negative electrode 30. The electrode assembly has a structure in which a stacking unit 200 manufactured in the lamination & stacking manner is stacked on each of both sides (upper and lower sides) of a folding unit 100 manufactured in a Z-folding manner.

That is, in the folding unit 100, a positive electrode unit and a negative electrode unit are alternately inserted between layers of a separator 40 of which one side and the other side are folded in a zigzag shape in a direction (a horizontal direction in FIG. 2) perpendicular to a direction (a vertical direction in FIG. 2) in which the positive electrode 10 and the negative electrode 20 are stacked.

Here, the negative electrode unit in which the negative electrode is disposed at each of the outermost layers (the uppermost layer and the lowermost layer) and the positive electrode unit in which the positive electrode is disposed at each of the outermost layers are cells that constitutes individual electrodes or individual units.

Also, the stacking unit has a structure in which the positive electrode 10, the separator 30, and the negative electrode 20, each of which is cut to a predetermined size, are sequentially stacked. The positive electrode 10, the separator 30, and the negative electrode 20, which are stacked in the stacking unit, are bonded to each other at contact surfaces therebetween by heat and a pressure. The stacking unit has a structure in which one separator 30 is further added when the negative electrode 20 and the positive electrode 10 are disposed at the outermost layers of the folding unit 100.

Furthermore, when the stacking unit 200 is stacked on each of the upper and lower layers of the folding unit 100, the positive electrode or the negative electrode, which is disposed at the outermost layer of the stacking unit 200, is a single-sided electrode in which an active material is applied to only one surface of a collector. The single-sided electrode disposed at the outermost layer is disposed so that the active material is applied to a surface contacting the separator (so that a positive electrode collector or a negative electrode collector is disposed at the outermost layer).

Hereinafter, embodiments according to the present invention will be described with reference to the accompanying drawings.

First Embodiment

Figure 2:
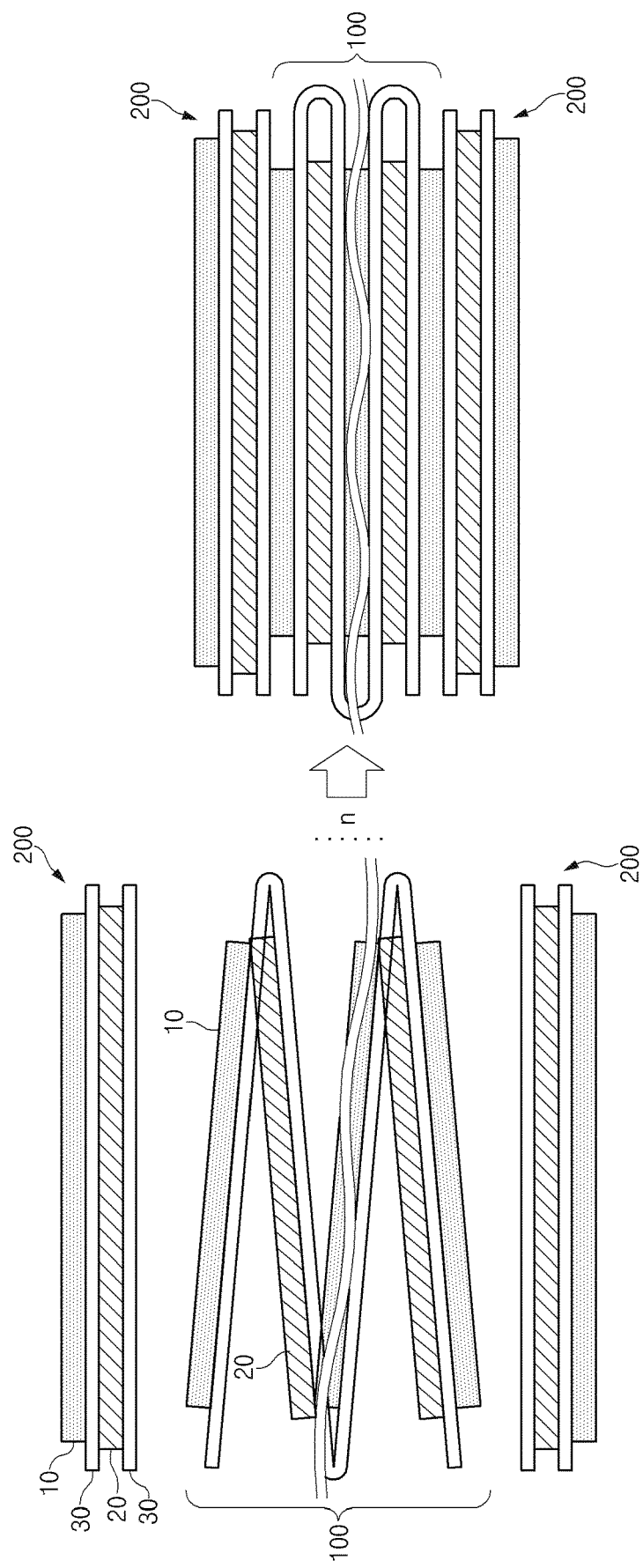
FIG. 2 is a front view illustrating a process of manufacturing an electrode assembly according to a first embodiment of the present invention.

FIG. 2 is a front view illustrating a process of manufacturing an electrode assembly according to a first embodiment of the present invention. As illustrated in the drawing, in a folding unit according to this embodiment, a negative electrode is one individual negative electrode 20, and a positive unit is one individual positive electrode 10.

Also, a stacking unit is a monocell in which one positive electrode 10, one negative electrode 20, and two separators 30 are stacked. In the stacking unit, one of the separators 30 is stacked between the positive electrode 10 and the negative electrode 20, and the other one is stacked at a position contacting the positive electrode 10 disposed at the outermost layer of the folding unit 100. That is, in the stacking unit, the positive electrode 10/the separator 30/the negative electrode 20/the separator 30 are stacked sequentially from the outermost layer.

In this embodiment, although the positive electrode 10 is stacked at the outermost layer of the folding unit 100 and the outermost layer of the stacking unit 200, the present invention is not limited thereto. For example, the negative electrode 20 may be stacked at the outermost layer of the folding unit 100 and the outermost layer of the stacking unit 200.

The folding unit 100 has a structure in which n electrodes (the sum of the number of stacked positive and negative electrodes) are stacked, where n is a natural number greater than at least 2. In this embodiment, the stacking unit 200 is stacked on each of upper and lower layers of the folding unit 100 in which the positive electrode 10 is disposed at each of the uppermost and lowermost layers. Here, the stacking unit 200 is stacked so that a surface thereof, on which the separator is disposed, contacts the outermost positive electrode 10 of the folding unit 100.

This embodiment is an embodiment having the most basic stacking structure in the present invention. Thus, second to fourth embodiments to be described later may have structures in which the structure according to the first embodiment is modified, but have the same technical idea as the first embodiment in that the stacking unit 200 is additionally stacked on both sides of the folding unit 100.

Second Embodiment

Figure 3:
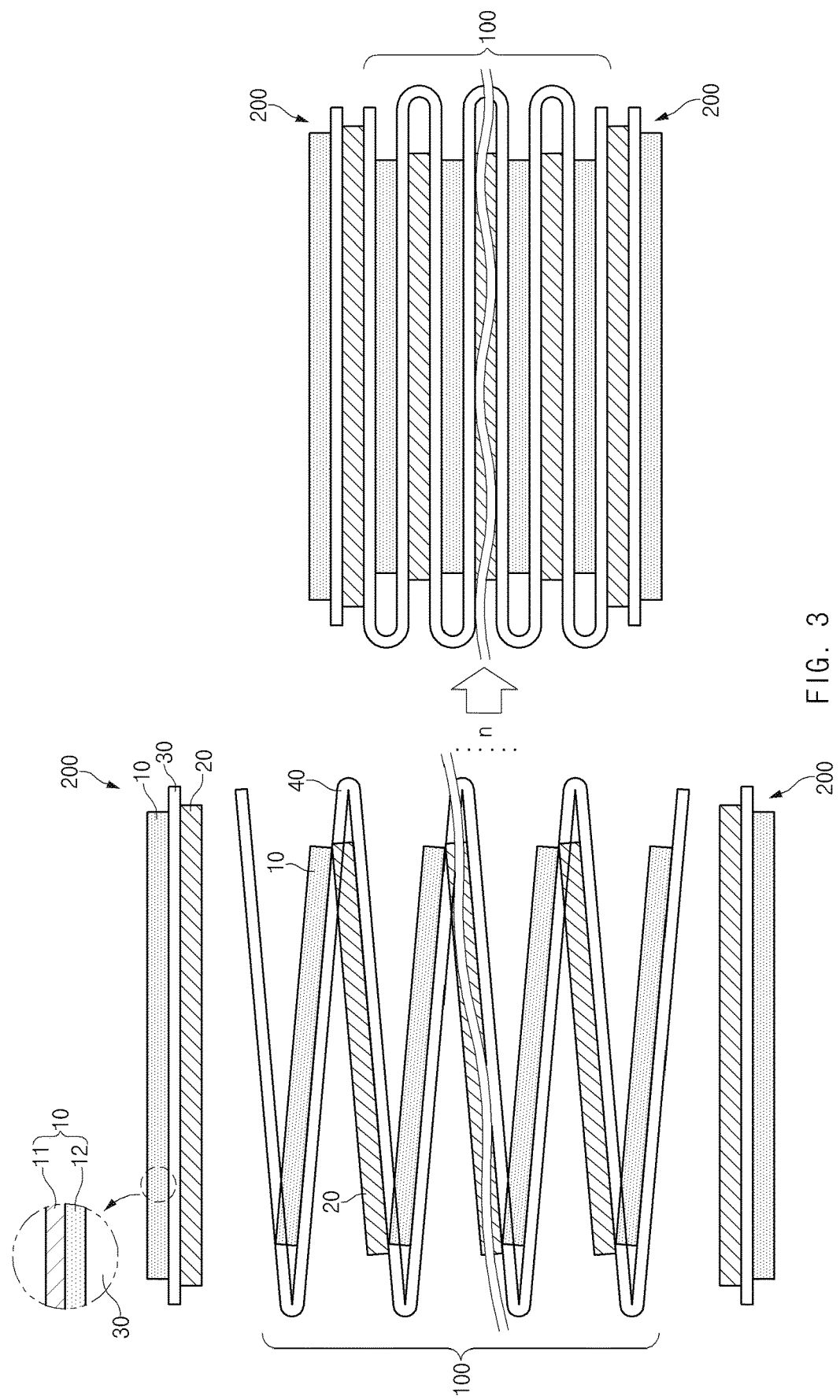
FIG. 3 is a front view illustrating a process of manufacturing an electrode assembly according to a second embodiment of the present invention.

FIG. 3 is a front view illustrating a process of manufacturing an electrode assembly according to a second embodiment of the present invention. In this embodiment, a separator 40 is stacked at the outermost layer of a folding unit 100 (unlike the first embodiment, an electrode is not stacked at the uppermost layer when a positive electrode and a negative electrode are alternately inserted to both sides of a separator of a folding unit).

Also, a stacking unit 200 additionally stacked on each of upper and lower layers of the folding unit 100 is provided as a monocell in which one positive electrode 10, one negative electrode 20, and one separator 300 are stacked.

As illustrated in the drawing, since the electrode disposed at the outermost layer of the folding unit 100 is the positive electrode 10, the stacking unit 200 is stacked in a direction in which the negative electrode 20 faces the folding unit 100.

Third Embodiment

Figure 4:
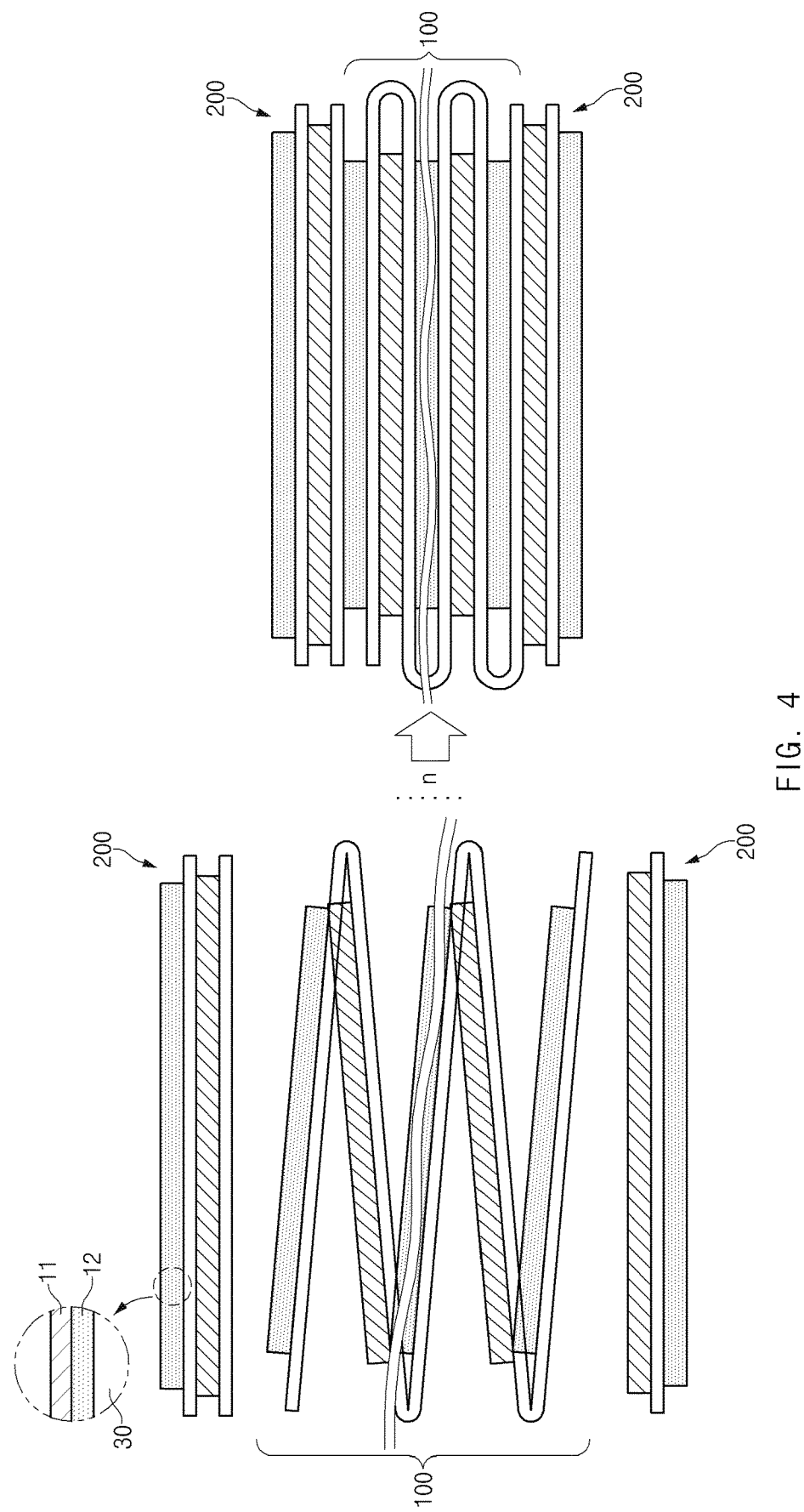
FIG. 4 is a front view illustrating a process of manufacturing an electrode assembly according to a third embodiment of the present invention.

FIG. 4 is a front view illustrating a process of manufacturing an electrode assembly according to a third embodiment of the present invention. In this embodiment, a positive electrode 10 is stacked at the uppermost layer of outermost layers of a folding unit 100, and a separator 40 is disposed at the lowermost layer.

Also, a stacking unit 200 stacked on an upper side of the folding unit 100 has a monocell structure in which a positive electrode 10/a separator 30/a negative electrode 20/a separator 30 are stacked sequentially from the outermost layer (uppermost layer), like the first embodiment. Also, the stacking unit 200 stacked on a lower side of the folding unit 100 is provided as a monocell in which one positive electrode 10, one separator 30, and one negative electrode 20 are stacked, like the second embodiment. Here, the negative electrode 20 faces an upper side.

Fourth Embodiment

Figure 5A:
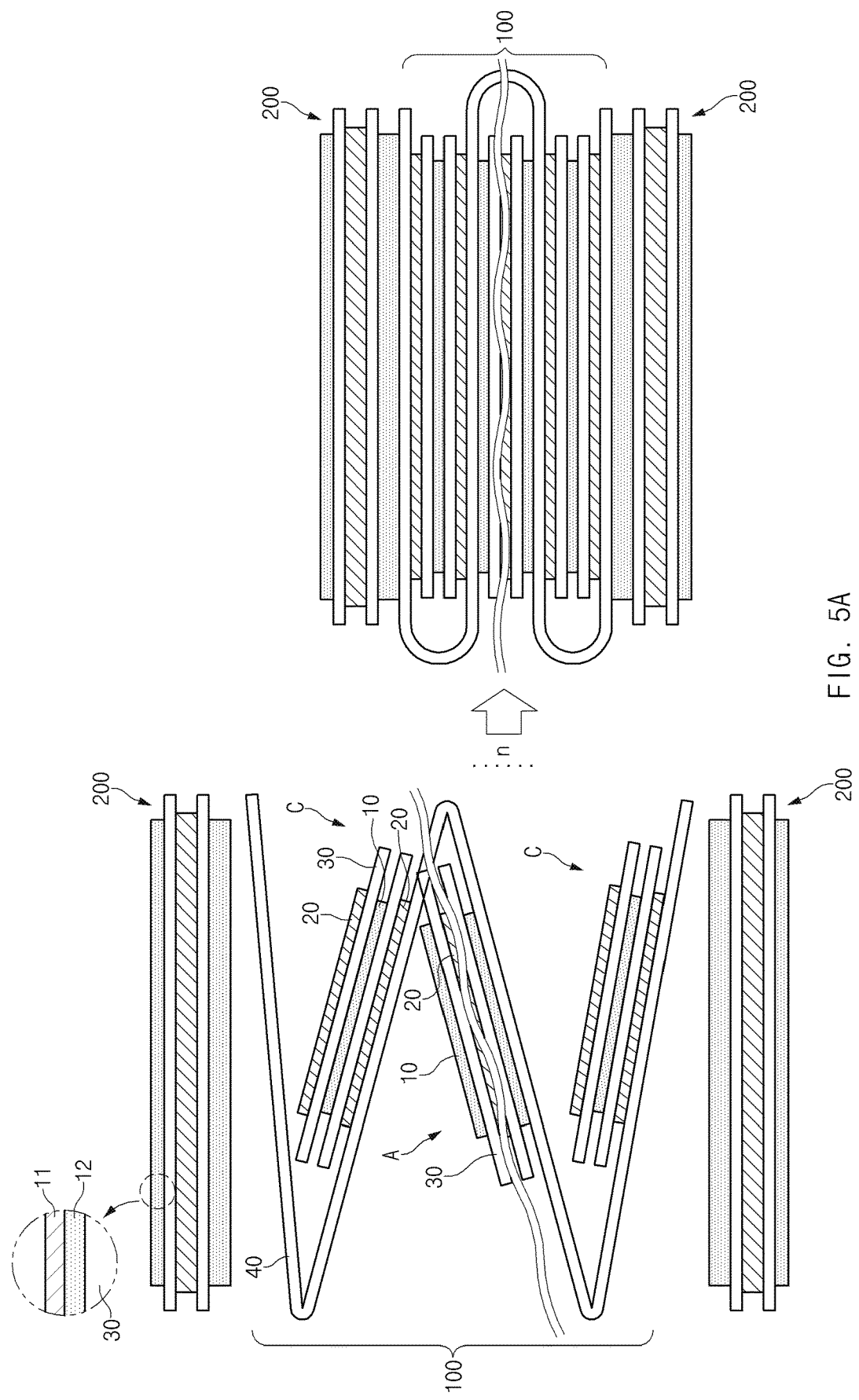
FIG. 5a is a front view illustrating a process of manufacturing an electrode assembly according to a fourth embodiment of the present invention.

FIG. 5a is a front view illustrating a process of manufacturing an electrode assembly according to a fourth embodiment of the present invention.

In this embodiment, each of a positive electrode unit and a negative electrode unit is provided as a bicell C (a C type bicell in which a positive electrode is disposed at an intermediate layer) in which a plurality of electrodes are stacked instead of individual electrodes. That is, the negative electrode unit is a bicell C in which a negative electrode 20 is tacked on both the outermost layers, and one or more positive electrodes 10 are stacked between the negative electrodes 20, and the positive electrode unit is a bicell A (an A type bicell in which the negative electrode is stacked at an intermediate layer) in which the positive electrode 10 is stacked on both the outermost layer, and one or more negative electrodes 20 are stacked between the positive electrodes 10.

In more detail, as illustrated in the drawing, the positive electrode unit is the A type bicell in which the positive electrode 10/the separator 30/the negative electrode 20/the separator 30/the positive electrode 10 are stacked sequentially from the outermost layer, and the negative electrode unit is the C type bicell in which the negative electrode 20/the separator 30/the positive electrode 10/the separator 30/the negative electrode 20 are stacked sequentially from the outermost layer.

Here, the positive electrode 10, the separator 30, the negative electrode 20, which are stacked to constitute each of the negative electrode unit and the positive electrode unit, are bonded to each other at contact surfaces therebetween. Each of the negative electrode unit and the positive electrode unit is configured so that three electrodes are stacked, but the present invention is not limited thereto. For example, five, seven or more electrodes may be stacked.

The folding unit 100 is configured so that the separator 40 is disposed at the uppermost layer and the lowermost layer. Also, the stacking unit 200 stacked on each of the upper side and the lower side of the folding unit 100 is provided as the bicell (more specifically, the A type bicell). That is, in the bicells stacked at the outermost layer of the folding unit 100, the negative electrode 20 is disposed at the outermost layer. Also, the stacking unit 200 has the bicell structure in which the positive electrode 10 is disposed on the surface contacting the folding unit 100. Here, in the stacking unit 200, although three electrodes are stacked in the drawing, the present invention is not limited thereto. For example, five, seven or more electrodes may be stacked.

Figure 5B:
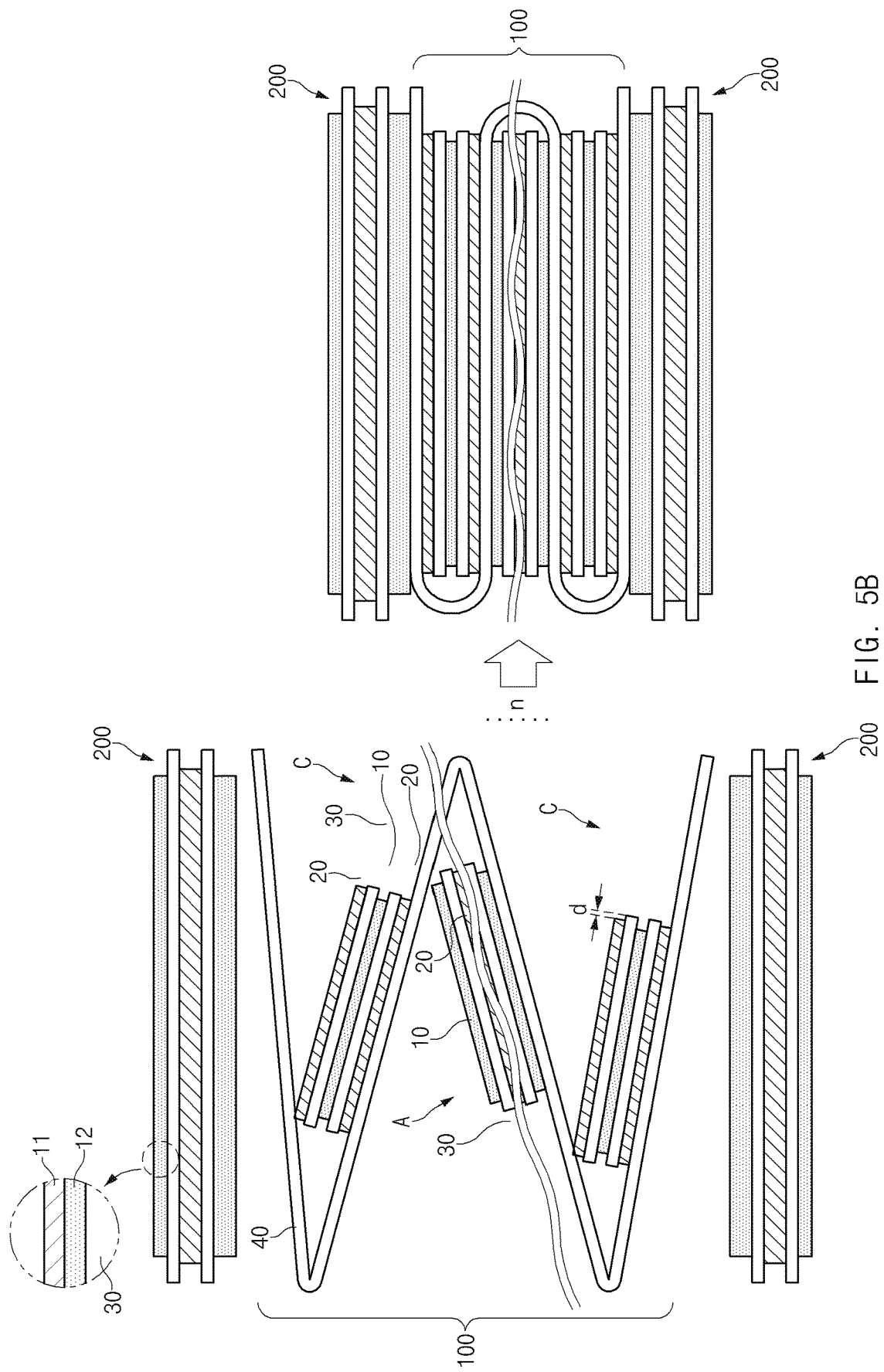
FIG. 5b is a front view illustrating a process of manufacturing an electrode assembly derived from the fourth embodiment of the present invention.

Furthermore, FIG. 5B illustrates a state in which a difference in area between the separator and the negative electrode is not generated or is small in the electrode assembly according to the fourth embodiment. Referring to the drawings, in each of the bicell A constituting the negative electrode unit and the bicell A constituting the positive electrode unit, which are illustrated in FIG. 5a, the separator 40 has the widest area, followed by the negative electrode 20 having the widest area, and the positive electrode 10 has the smallest area. On the other hand, in the bicell C and the bicell A, which are illustrated in FIG. 5b, the negative electrode 20 has an area equal to or slightly less than that of the separator 30 (in more detail, a difference 'd' in length between the negative electrode and the separator, which are illustrated in FIG. 5b, corresponds to about 0 to 0.3% of the length of the separator).

As described above, if the difference in area between the negative electrode 20 and the separator 30 is not generated or is reduced, the area of the negative electrode 20 may increase compared to the structure in which the separator has an area greater than that of the negative electrode as illustrated in FIG. 5a, under the condition in which the electrode assembly have the same volume. As a result, the positive electrode 10 may also increase in area to increase in charging and discharging capacity. Also, since measurement accuracy of a sensor (vision sensor) is improved during the production process (because there is no portion covered by the separator having a length greater than that of the negative electrode), a size and relative position of the negative electrode 20 may be more accurately grasped to reduce a production tolerance. When the tolerance is reduced as described above, the negative electrode may increase in size.

Although the positive electrode unit and the negative electrode unit are provided as the C type bicell and the A type bicell in this embodiment, the present invention is not limited thereto. For example, each of the positive electrode and the negative electrode may be provided as a monocell in which the uppermost electrode and the lowermost electrode are different from each other (for example, a cell in which a positive electrode/a separator/a negative electrode/a separator, a positive electrode/a separator/a negative electrode/a separator/a positive electrode/a separator/a negative electrode, a negative electrode/a separator/a positive electrode, a negative electrode/a separator/a positive electrode/a separator/a negative electrode/a separator/a positive electrode, or the like are stacked sequentially downward. Also, even though provided as the monocell, it is preferable that a difference in area between the separator 30 and the negative electrode 20 is minimally generated as possible due to the above-described reason. That is, the negative electrode may have a size of 99.7% to 100% of the size of the separator.

Although the coupling structure of the folding unit 100 and the stacking unit 200 has been described according to the first to fourth embodiments of the present invention, if the coupling structure has a structure in which the negative electrode unit and the positive electrode unit are inserted into the separator 40 while the separator 40 is folded in the zigzag shape, the structure may be applied to the folding unit 100 of the present invention, and if the coupling structure has a structure in which the electrodes 10 and 20 and the separator 30 are sequentially stacked, the structure may be applied to the stacking unit 200 of the present invention. In addition to the foregoing embodiments, more various combinations may be possible.

For reference, the electrode assemblies according to the first to fourth embodiments may be manufactured by a plurality of applicable manufacturing methods. Here, it is preferable that the stacking unit 200 is stacked on each of the upper and lower layers of the folding unit 100, and then, heat and a pressure are applied between the folding unit 100 and the stacking unit 200 to generate predetermined bonding force. That is, the bonding force between the folding unit 100 and the stacking unit 200 may prevent the folding unit 100 and the stacking unit 200 from being separated from each other when the electrode assembly is embedded in a pouch as well as wen an external impact is applied in the pouch. Such the bonding may be generated by thermocompression of the separator when predetermined heat and pressure are applied in the vertical direction (the stacking direction) after the folding unit 100 and the stacking unit 200 are completely stacked.

One of the reasons in which the stacking unit 200 is stacked on the outer surface of the folding unit 100 in the present invention is because the single-sided electrode is easily disposed on the outermost layer in the electrode assembly. That is, in order that the single-sided electrode is disposed at the outermost layer of the folding unit 100 without the additional stacking of the stacking unit 20, a device for separately inserting the single-side electrode in addition to a device for sequentially inserting the negative electrode unit and the positive electrode unit from left and right sides is required. However, the device for separately inserting the single-sided electrode may interfere with the device for inserting the negative electrode unit and the positive electrode unit, and a production time may increase because the single-sided electrode is separately inserted. On the other hand, like the structure according to the present invention, the structure in which the stacking unit 200 is added to the outer surface (the single-sided electrode is stacked on the outermost layer) of the folding unit 100, which are individually manufactured, may have an advantage of simplifying the manufacturing process. Also, since the stacking unit has s structure in which the plurality of electrodes and the separator are bonded to each other therebetween and has a thickness thicker than that of the single-sided electrode, the stacking unit may be more stably and efficiently stacked compared to the case in which only the single-sided electrode is stacked in the manufacturing process. For example, since the single-sided electrode has a thickness thinner than that of a single positive or negative electrode, a stacking speed may be limited to prevent the electrode from being damaged. However, the stacking unit may have a relatively free advantage in constraint condition.

As described above, when the electrode (the positive electrode or the negative electrode) stacked at the outermost layer is the single-sided electrode rather than the double-sided electrode, degradation of the electrode due to precipitation of the active material may be reduced, and the possibility of occurrence of the short circuit due to the external impact may be reduced.

Thus, in the present invention, the electrode (the positive electrode in FIG. 5) disposed at the outermost layer of the stacking unit 200 is provided as the single-sided electrode. That is, as illustrated in FIG. 5, the positive electrode disposed at the outermost layer of the stacking unit 200 is provided as the single-sided electrode in which the positive electrode active material 12 is applied on only a surface of the positive electrode collector, which faces the separator 1, and the positive electrode active material 12 is not applied to a surface that is exposed to the outside.

As described above, the structure in which the single-sided electrode is disposed at the outermost layer of the stacking unit 200 may be applied to the first to third embodiments in addition to the fourth embodiment.

Furthermore, in the present invention, the separator stacked between the negative electrode unit and the positive electrode unit in the folding unit has a thickness different from that of the separator 30 stacked within the stacking unit 200 and that of the separator 30 stacked within the bicell when each of the negative electrode unit and the positive electrode unit is provided as the bicell. That is, since the separator 40 receives an external force during the folding in the manufacturing process, the separator 40 may have a thicker thickness or be made of a material having higher durability.

In the present invention, as the electrode assembly having the above technical features is provided, a secondary battery in which the electrode assembly having the above-described structure is embedded in the pouch and a secondary battery module in which a plurality of secondary batteries are mounted to be electrically connected to each other may be additionally provided.

In the present invention having the above structure, since the folding unit 100 having the Z-folding structure and the stacking unit 200 having the lamination & stacking structure are coupled to each other, the positive electrode may increase in size to increase in capacity compared to the negative electrode in the folding unit 100 (that is, as described above, since an allowable tolerance according to the production process, which is a factor that the size of the positive electrode has to be reduced in the state in which the negative electrode has a fixed size, is minimized, the size of the positive electrode is set to a maximum value considering the allowable tolerance), and since the stacking unit 200, in which the electrodes disposed at the outermost layers of the folding unit 100 and the separator are bonded to each other, is provided to improve stability (that is, an effect of increasing in size of the positive electrode relative to the negative electrode due to the reduction of the allowable tolerance, which is the advantage of the Z-folding type electrode assembly and an effect of increasing in stability, which is an advantage of the lamination & stacking type electrode assembly, may be realized at the same time.

Furthermore, the positive electrode 10 or the negative electrode 20, which is disposed at the outermost layer of the stacking unit 200, may be provided as the single-sided electrode in which the active material is applied to only one surface of the collector to reduce the degradation and also reduce the possibility of occurrence of the short circuit due to the external impact.

The present invention may be easily applied to the electrode assembly having the Z-folding structure according to the related art by only adding the stacking unit 200 and provide the structure in which the single-sided electrode is easily disposed at the outermost layer.

Also, the thickness of the separator 40 stacked between the negative electrode unit and the positive electrode unit in the folding unit 100 and the thickness of the separator 40 stacked within the stacking unit may be different from each other to minimize the volume of the electrode assembly.

Furthermore, in the present invention, structures according to fifth to eighth embodiments are additionally provided as structures that are applicable to the electrode assemblies according to the first to fourth embodiments.

Fifth Embodiment

Figure 6:
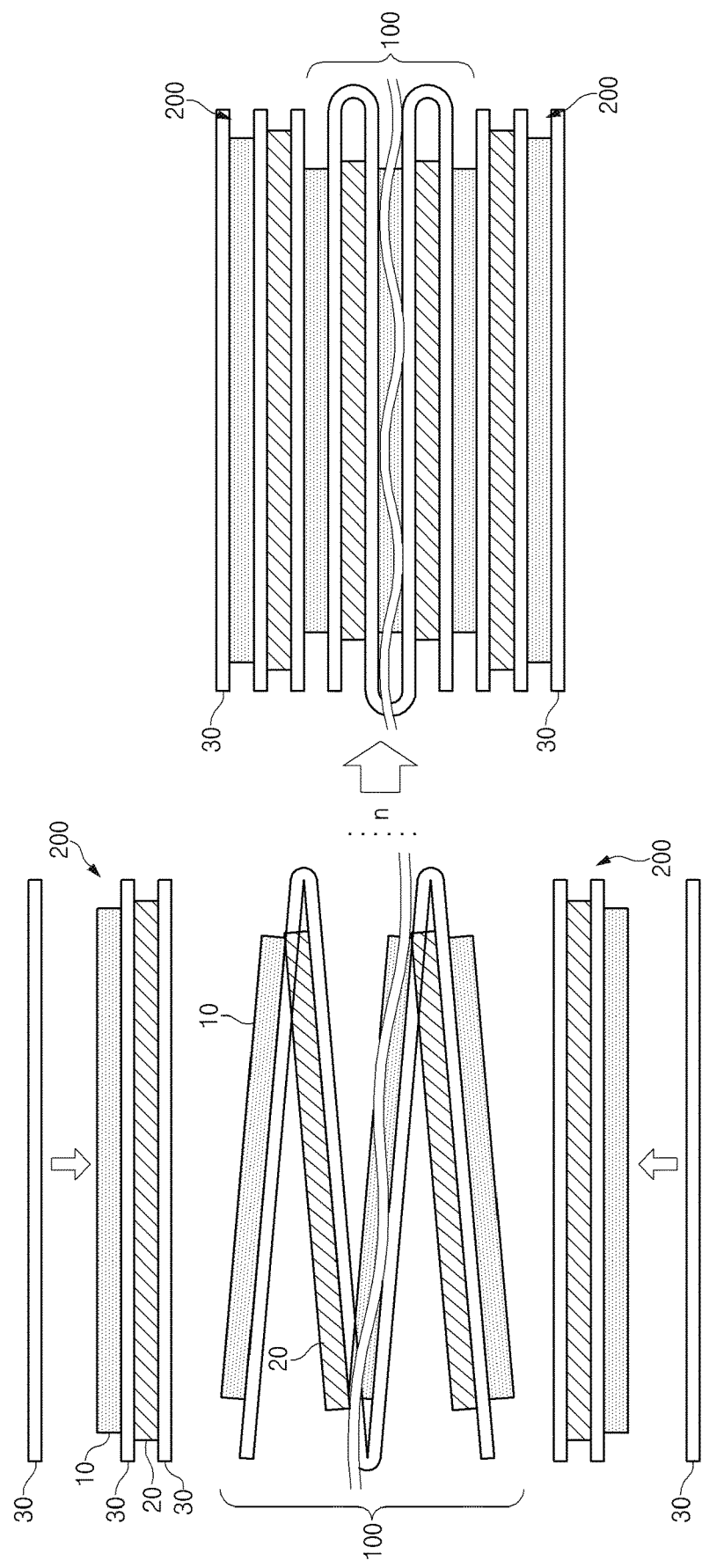
FIG. 6 is a front view illustrating a process of manufacturing an electrode assembly according to a fifth embodiment of the present invention.

FIG. 6 is a front view illustrating a process of manufacturing an electrode assembly according to a fifth embodiment of the present invention.

This embodiment is characterized in that a separator is additionally stacked on the outermost layers (the uppermost layer and the lowermost layer) of the electrode assemblies according to the foregoing embodiments.

That is, in the electrode assemblies according to the first to fourth embodiments, when the electrodes 10 and 20 are disposed at the outermost layers and then are inserted into the pouch, the electrodes 10 and 20 may directly contact an inner wall of the pouch.

In general, the pouch is made of a material containing a metal components (aluminum, etc.) although the material is changed according to the types of pouch. Thus, when the electrode assembly is inserted into the pouch, the separator stacked at the outermost layer may protect the electrode assembly against chemical changes or external impacts.

Sixth Embodiment

Figure 7:
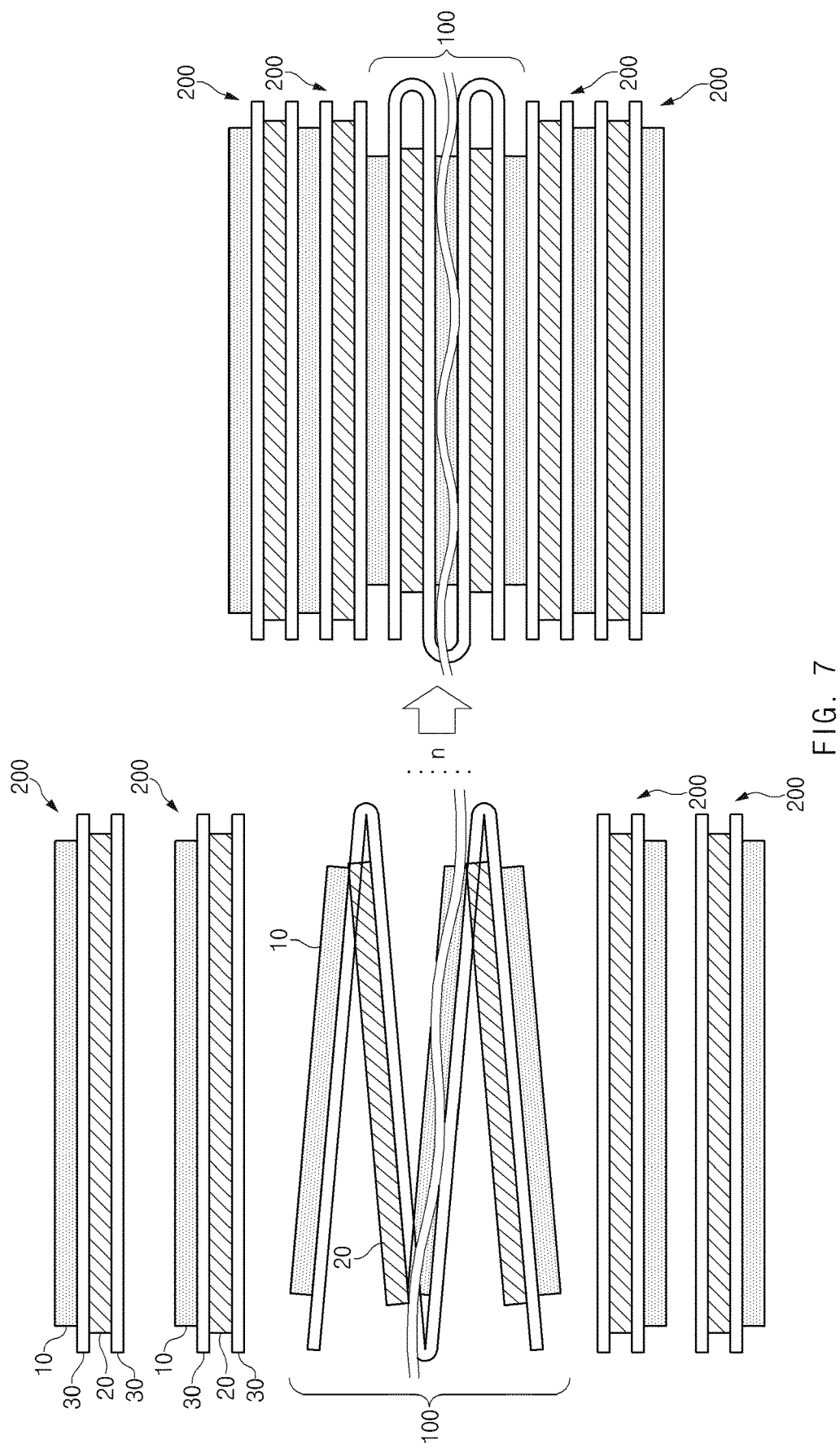
FIG. 7 is a front view illustrating a process of manufacturing an electrode assembly according to a sixth embodiment of the present invention.

FIG. 7 is a front view illustrating a process of manufacturing an electrode assembly according to a sixth embodiment of the present invention.

This embodiment has a structure in which an auxiliary cell in which a positive electrode 10, a separator 30, and a negative electrode 20, each of which is cut to a predetermined size, are sequentially stacked, is additionally stacked at the outermost layers (the uppermost layer and the lowermost layer) of each of the electrode assemblies according to the forgoing embodiments.

The auxiliary cell may have a structure in which a separator/a negative electrode/a separator are bonded to each other. Alternatively, as illustrated in FIG. 7, the auxiliary cell may have the same structure as the stacking unit 200, i.e., have a structure in which a positive electrode/a separator/a negative electrode/a separator are bonded to each other. Also, in addition, more or fewer electrodes and the structure in which the separator is stacked may be provided according to specification of the electrode assembly.

Seventh Embodiment

Figure 8:
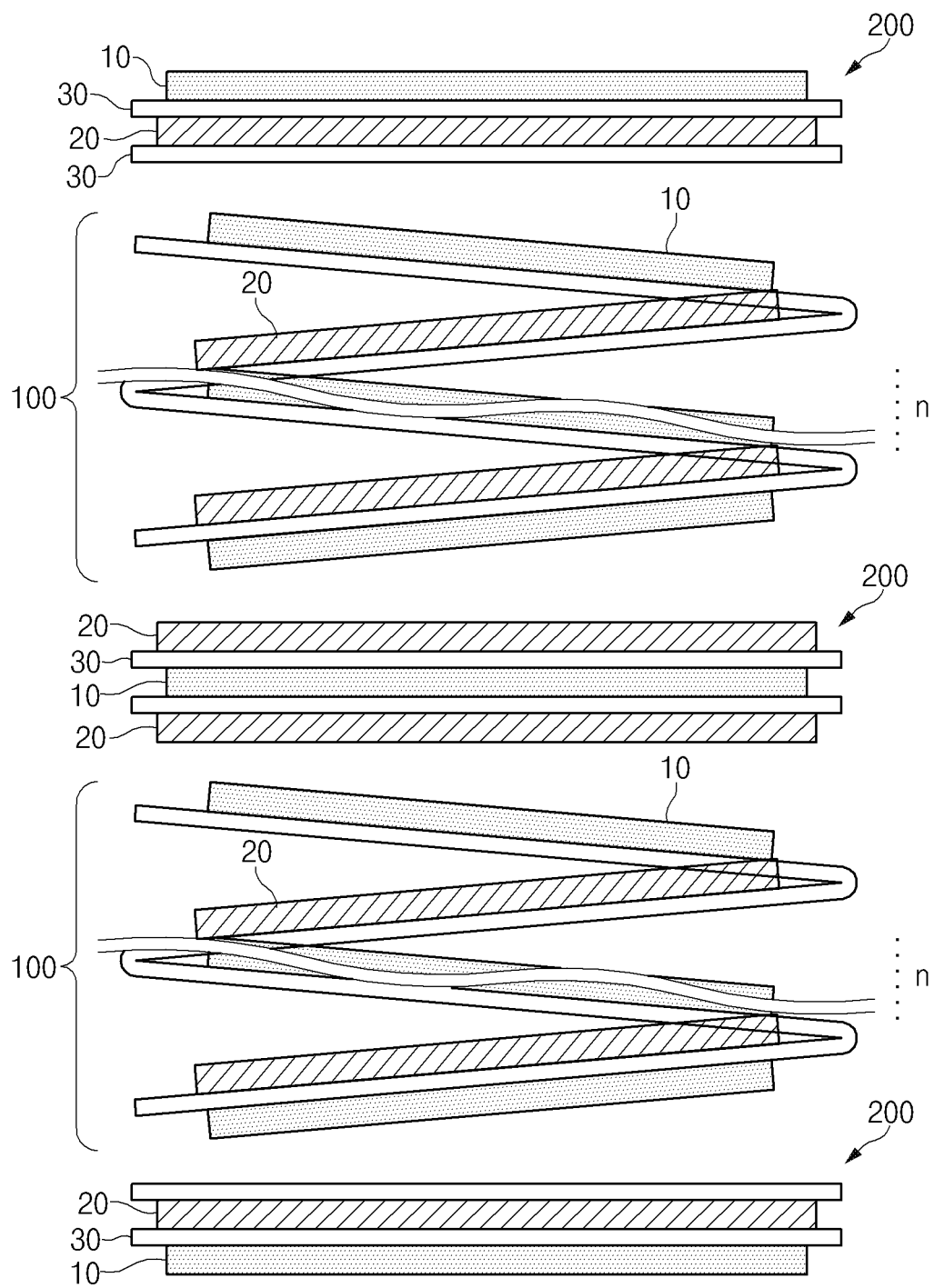
FIGS. 8 and 9 are front views illustrating a process of manufacturing an electrode assembly according to a seventh embodiment of the present invention.
Figure 9:
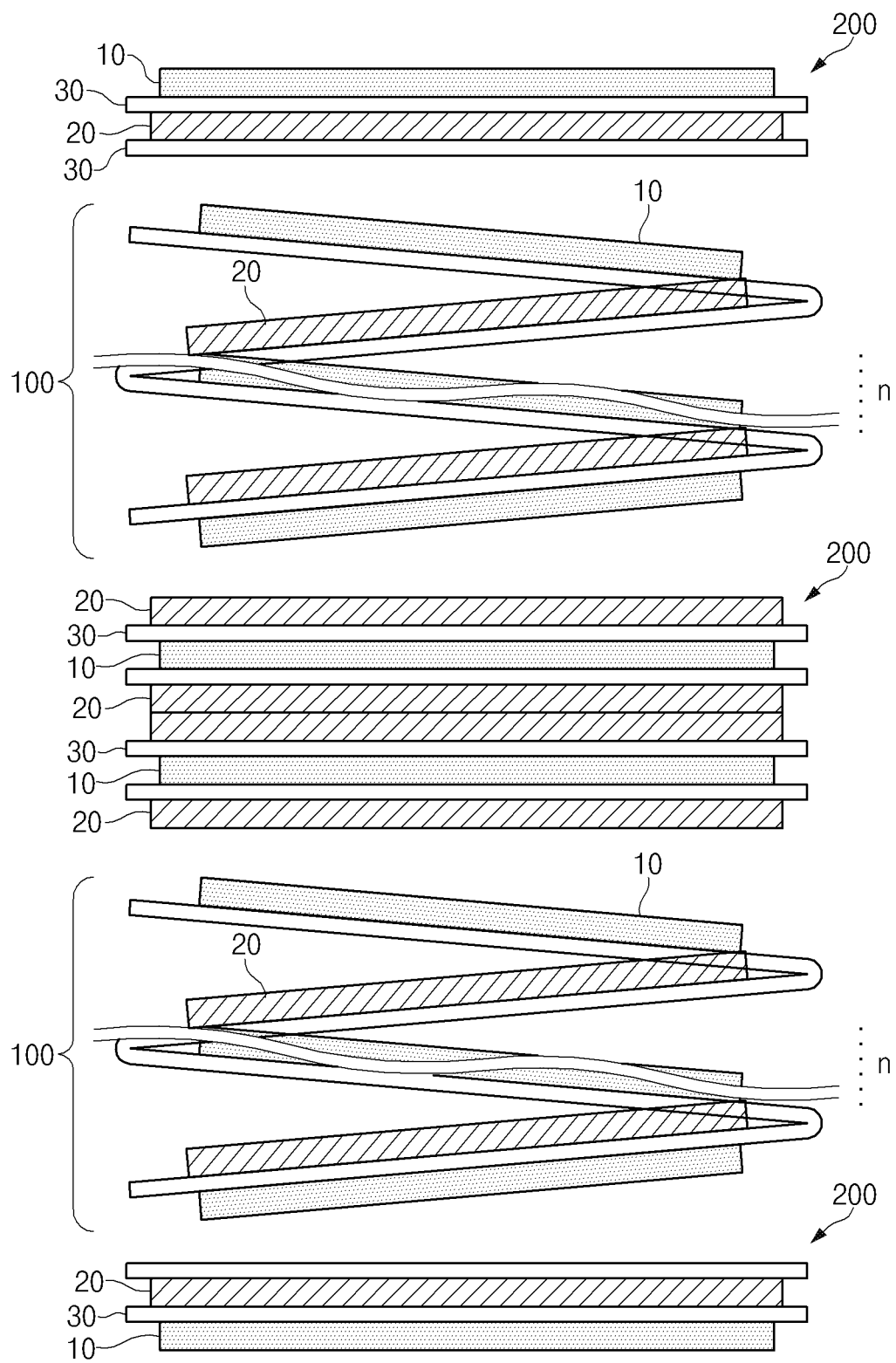

FIGS. 8 and 9 are front views illustrating a process of manufacturing an electrode assembly according to a seventh embodiment of the present invention.

In this embodiment, two or more folding units 100 are sequentially stacked between the stacking units 200 disposed at the uppermost layer and the lowermost layer of the electrode assembly according to the foregoing embodiments.

In the Z-folding manner, when the number of stacked layers increases, the cumulative tolerance may increase. Thus, even if the folding unit 100 has the same stacking number, the cumulative tolerance may be reduced in a structure, in which two folding units, each of which has the same stacking number, are separately manufactured and then be bonded to each other, rather than one folding unit having more stacking number. Thus, in the structure according to this embodiment, two folding units, each of which has less stacking number, may be stacked to reduce the cumulative tolerance, and also, the stacking number may increase to increase in capacity.

Here, one or more stacking units 200, each of which has a structure in which a positive electrode, a separator, and a negative electrode, each of which is cut to a predetermined size, are sequentially stacked, are additionally inserted between the two folding units 100 that are continuously stacked (see FIG. 9). Each of the stacking units 200 may have a bicell in which the uppermost layer and the lowermost layer have the same polarity or a monocell in which the uppermost layer and the lowermost layer have polarities different from each other according to the polarity of the outermost electrode of the folding unit 100. Alternatively, the stacking unit 200 may have a structure in which the bicell and the monocell are combined with each other or a structure in which a plurality of specific monocells or bicells are combined and stacked with each other.

In some cases, the structure of the stacking unit 200 stacked between the two folding units 100 and the structure of the stacking unit 200 stacked at the upper and lower layers of the folding units 100 may be completely the same.

It is preferable that the negative electrode 20 and the positive electrode 10 are manufactured so that a gap d between each of the negative electrode 20 and the positive electrode 10 and a point at which the separator 40 is folded becomes zero or be close to zero as possible to reduce the cumulative tolerance and prevent drooping or wrinkles of the separator 40 from occurring.

Figure 10:
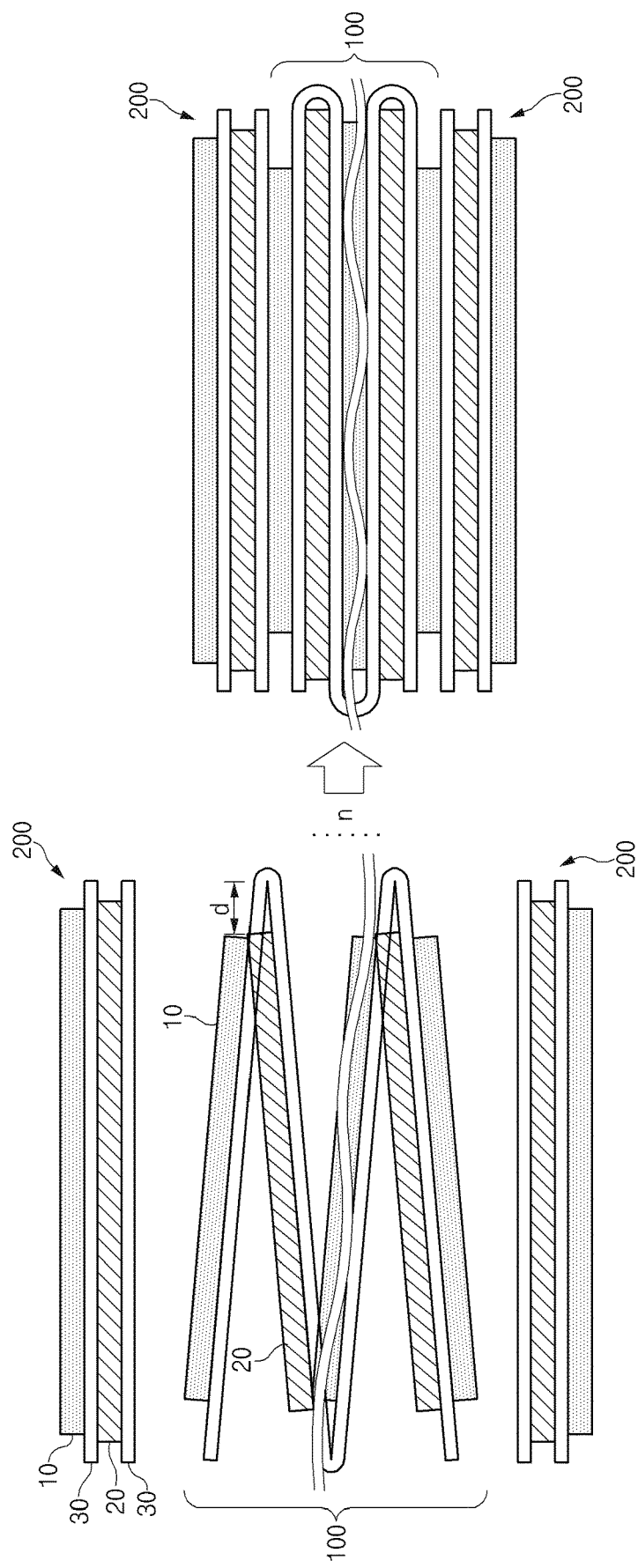
FIG. 10 is a front view illustrating a gap 'd' between a point at which a separator is folded and a negative electrode in a folding unit.

That is, referring to FIG. 10, which illustrates a gap d between a point at which the separator 40 is folded and the negative electrode, the negative electrode unit stacked in the folding unit 100 is one negative electrode 20, and the positive electrode unit stacked in the folding unit 100 is one negative electrode 10. In the drawing, the gap d between the point at which the separator 40 is folded and the negative electrode is greater than zero due to the thickness of the negative electrode 20. However, since each of the negative electrode 20 and the separator 40 has an actually sufficient thin thickness, and the separator 40 has elasticity, the gap d between the folding point and the negative electrode 20 may be zero or close to zero (an end side of the negative electrode 20 is disposed to contact the point at which the separator is folded).

Here, since the gap d generated in the negative electrode 20 becomes zero, the negative electrode 20 may have a maximum area when the electrode assembly has the same volume. As the area of the positive electrode 20 increases (which is less than that of the negative electrode and has to be reduced by an allowable tolerance), the positive electrode 10 may also increase in area. Thus, as the gap d generated in the negative electrode 20 is close to zero, the area of the positive electrode 10 increases to increase in capacity. As a result, it is preferable that the folding unit according to the present invention is manufactured so that the gap d between the point at which the separator is folded and the negative electrode 20 is zero or close to zero.

Eighth Embodiment

Figure 11:
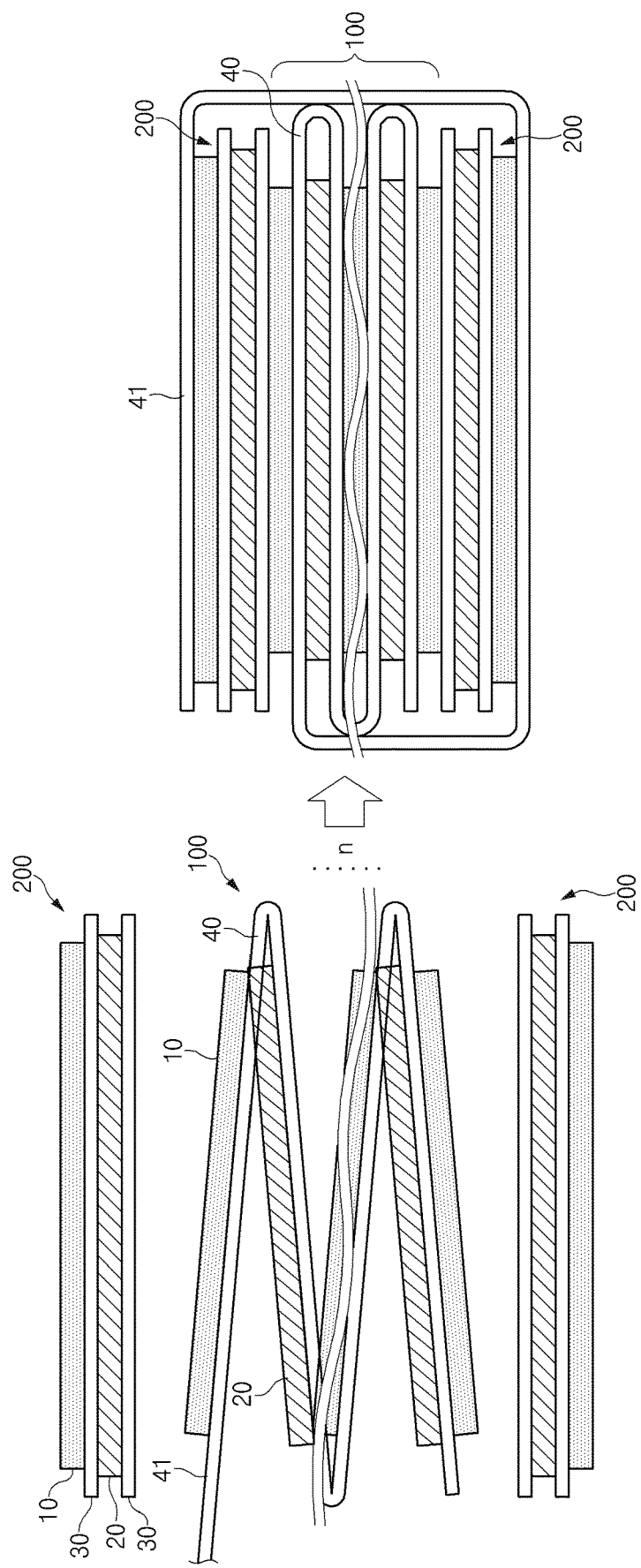
FIG. 11 is a front view illustrating a process of manufacturing an electrode assembly according to an eighth embodiment of the present invention.

FIG. 11 is a front view illustrating a process of manufacturing an electrode assembly according to an eighth embodiment of the present invention.

This embodiment is characterized in that one end of the separator 40 in the folding unit 200 has an extension part 41 extended by a predetermined length.

As illustrated in the drawing, the extension part 41 may surround the folding unit 100 and the stacking units 200 after stacking units 100 are respectively stacked on the upper and lower portions of the folding unit 100, and an end of the extension part 41 may be bonded to be fixed to a surface of the folding unit 100 or the stacking unit 200.

FIGS. 6 to 11 illustrate only the state in which the features according to the sixth to eighth embodiments are applied to the electrode assembly according to the first embodiment. However, the features according to the sixth to eighth embodiments may be applied to the electrode assemblies according to the second to fourth embodiments in addition to the first embodiment.

The present invention may provide a structure in which the separator 30 is stacked at the outermost layer at an opposite side of a direction in which the stacking unit 200 faces the folding unit 100 and a structure in which the auxiliary cell is additionally stacked on the outer surface of the stacking unit 200. That is, the present invention may provide various structures according to the required specification of the secondary battery.

Two or more folding units 100 may be continuously stacked to reduce the cumulative tolerance, and the stacking number may increase to increase in capacity.

Also, in the folding unit 100, one end of the separator 40 may have the extension part 41 that is extended by the predetermined length. Also, the extension part 41 may surround the folding unit 100 and the stacking units 200, and an end of the extension part 41 may be bonded to be fixed to the surface of the folding unit 100 or the stacking unit 200 to prevent shaking and improve the durability against the external impact. In addition, when a tape is additionally adheres to fix the electrode assembly, the entire structure may be surrounded by the separator. Thus, a taping operation may be easily performed, and a taping method may be variously performed. For example, according to eighth embodiment, the extension part 41 of the separator 40 surrounds the entire structure, and then, the tap for enhancing the fixing force may be attached to surround the entire electrode assembly. Here, the tap may be taped to fix the full length direction perpendicular to the width direction rather than the width direction of the electrode assembly surrounded by the extension part 41. Alternatively, the tape may be taped to fix only the upper and lower ends of the electrode assembly or surround the entire electrode assembly to be boned.

Furthermore, according to the present invention, the stacking unit has the structure in which the electrode and the separator are bonded to each other, whereas the folding unit has the structure in which the separator and the electrode are not bonded to each other (are movable in a horizontal direction perpendicular to the stacking direction). Thus, in the state in which the stacking unit 200 is stacked on the upper and lower portions of the folding unit 100, an alignment between the folding unit 100 and the stacking unit may be modified before the taping or the whole thermocompression is performed. That is, since the each electrode and the separator are not bonded to each other in the folding unit 100, some movement between the folding unit 100 and the stacking unit 200 may be allowed to be uniformly arranged in the vertical direction after the folding unit 100 and the stacking unit are stacked. This may be a unique advantage of the present invention having the structure in which the stacking unit 200 is stacked in the state in which the folding unit 100 is not fixed.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly, comprising:
a folding unit having a negative electrode unit and a positive electrode unit that are alternately inserted between layers of a separator that is folded in a zigzag shape; and
first and second stacking units each having a positive electrode, a separator, and a negative electrode that are sequentially stacked, each stacking unit being cut to a predetermined length,
wherein, within the folding unit, a negative electrode is disposed at an outermost layer of the negative electrode unit, and a positive electrode is disposed at an outermost layer of the positive electrode unit, and
the first stacking unit and the second stacking unit are stacked on an uppermost layer and a lowermost layer of the folding unit, respectively,
wherein the separator of the folding unit has a thickness greater than a thickness of the separator stacked within each of the first and second stacking units.

2. The electrode assembly of claim 1, wherein within each stacking unit, the positive electrode, the separator, and the negative electrode are bonded to each other at contact surfaces therebetween.

3. The electrode assembly of claim 2, wherein within each stacking unit, the positive electrode, the separator, and the negative electrode are bonded to each other, such that structural evidence is present indicating that heat and pressure were applied to bond each stacking unit.

4. The electrode assembly of claim 2, wherein one of the electrodes in each of the first and second stacking units is a single-sided electrode in which an active material is applied to only one surface of a collector thereof.

5. The electrode assembly of claim 4, wherein the one surface of each single-sided electrode is a surface contacting the separator of the respective stacking unit.

6. The electrode assembly of claim 1, wherein the negative electrode unit consists of only the negative electrode, and the positive electrode unit consists of only the positive electrode.

7. The electrode assembly of claim 6, wherein the negative electrode or the positive electrode of the folding unit is an outermost electrode of the folding unit, the outermost electrode of the folding unit being an uppermost electrode or a lowermost electrode of the folding unit, and the separator of the folding unit contacts each stacking unit.

8. The electrode assembly of claim 1, wherein each of the first and second stacking units is a monocell consisting of the positive electrode, the negative electrode, and two of the separators, a first one of the separators being disposed between the positive electrode and the negative electrode, and a second one of the separators being disposed at a position contacting respective uppermost and lowermost layers of the folding unit.

9. The electrode assembly of claim 6, wherein the separator of the first stacking unit and the separator of the second stacking unit are disposed adjacent to the uppermost layer and the lowermost layer of the folding unit, respectively, and each stacking unit is a monocell consisting of the positive electrode, the negative electrode, and the separator, the separator being stacked between the positive electrode and the negative electrode.

10. The electrode assembly of claim 6, wherein the uppermost and lowermost layers of the folding unit are outermost layers of the folding unit, the negative electrode or the positive electrode is stacked at a first one of the outermost layers of the folding unit, and a portion of the separator is disposed at a second one of the outermost layers,
the stacking unit stacked on the first one of the outermost layers is a monocell consisting of the positive electrode, the negative electrode, and two of the separators, a first one of the separators being disposed between the positive electrode and the negative electrode, and a second one of the separators being disposed at a position contacting the outermost layer of the folding unit, and
the stacking unit stacked on the second one of the outermost layers is a monocell consisting of the positive electrode, the negative electrode, and the separator, the separator being stacked between the positive electrode and the negative electrode.

11. The electrode assembly claim 1, wherein the negative electrode unit of the folding unit is a bicell having two of the negative electrodes disposed at first and second outermost layers of the negative electrode unit, and having one or more of the positive electrodes stacked between the two negative electrodes, and
the positive electrode unit of the folding unit is a bicell having two of the positive electrodes at first and second outermost layers of the positive electrode unit, and having one or more of the negative electrode stacked between the two positive electrodes.

12. The electrode assembly of claim 11, wherein the negative electrode unit consists of the negative electrode/the separator/the positive electrode/the separator/the negative electrode stacked sequentially, and the positive electrode unit consists of the positive electrode/the separator/the negative electrode/the separator/the positive electrode stacked sequentially.

13. The electrode assembly of claim 12, wherein each of the electrodes and the separator of the negative electrode unit and the positive electrode unit are bonded to each other at contact surfaces therebetween.

14. The electrode assembly of claim 11, wherein the separator of the folding unit has a thickness different from a thickness of the separator stacked within each of the negative electrode unit and the positive electrode unit.

15. The electrode assembly of claim 1, wherein, in each of the first and second stacking units, a second separator is disposed at an outermost layer of the stacking unit facing away from the folding unit.

16. The electrode assembly of claim 1, further comprising first and second auxiliary cells in which a positive electrode, a separator, and a negative electrode are sequentially stacked, each of which is cut to the predetermined length, the first and second auxiliary cells being stacked on an outer surface of the respective first and second stacking units.

17. The electrode assembly of claim 16, wherein a stacking structure of the positive electrode, the separator, and the negative electrode of each of the auxiliary cells is the same as a stacking structure of the positive electrode, the separator, and the negative electrode of each of the stacking units.

18. The electrode assembly of claim 1, wherein the folding unit comprises two or more folding units that are stacked between the first and second stacking units.

19. The electrode assembly of claim 18, further comprising a third stacking unit in which a positive electrode, a separator, and a negative electrode are sequentially stacked, the third stacking unit being cut to the predetermined length, the third stacking unit being disposed between two of the folding units.

20. The electrode assembly of claim 1, wherein the negative electrode unit consists of only the negative electrode, and the positive electrode unit consists of only the positive electrode, the negative electrode of the negative electrode unit has planar surface area greater than a planar surface area of the positive electrode of the positive electrode unit, and a first gap between a first point at which the separator of the folding unit is folded and a peripheral edge of the negative electrode is less than a second gap between a second point at which the separator of the folding unit is folded and a peripheral edge of the positive electrode.

21. The electrode assembly of claim 1, wherein an end of the separator of the folding unit comprises an extension part extending beyond a peripheral edge of the negative electrode unit or a peripheral edge of the positive electrode unit by a predetermined length, and the extension part surrounds the folding unit and the first and second stacking units, and an end of the extension part is fixed to a surface of the folding unit or the first or second stacking unit.

* * * * *